United States Patent [19]
Spears, Jr.

[11] 3,808,796
[45] May 7, 1974

[54] FUEL DRAIN SYSTEM
[75] Inventor: Esten W. Spears, Jr., Indianapolis, Ind.
[73] Assignee: General Motors Corporation, Detroit, Mich.
[22] Filed: Oct. 20, 1972
[21] Appl. No.: 299,604

[52] U.S. Cl. .............................. 60/39.09 F, 137/512
[51] Int. Cl. ............................ F23n 5/24, F02c 9/00
[58] Field of Search ................. 60/39.09 P, 39.09 R; 137/512

[56] References Cited
UNITED STATES PATENTS

| 2,446,013 | 7/1948 | Kuyper | 60/39.09 R |
|---|---|---|---|
| 3,371,482 | 3/1968 | Camboulives et al. | 60/39.09 |
| 2,814,931 | 12/1957 | Johnson | 60/39.09 |
| 3,032,987 | 5/1962 | Taylor | 60/39.09 |
| 3,517,692 | 6/1970 | Elrod | 137/512 |

Primary Examiner—Carlton R. Croyle
Assistant Examiner—Warren Olsen
Attorney, Agent, or Firm—Paul Fitzpatrick

[57] ABSTRACT

A fuel drain system for a gas turbine engine includes a first drain for fuel which may gather in a sump downstream of the turbine, with a valve in the drain which closes when there is a slight pressure differential toward the turbine exhaust. This drain joins a second drain from a sump to which fuel may drain from the combustion apparatus of the engine. The combined drain goes through a second valve which remains open until pressure within the space ahead of the turbine becomes slightly greater than the pressure threshold of the first valve. Fuel which drains through the second valve passes to a catch basin and from this through a third valve to the engine fuel tank. The third valve closes at a pressure slightly above the setting of the second valve in the direction toward the fuel tank. A pressure responsive device lights an indicator light if there is substantial pressure downstream of the second valve indicating that it has failed to close. Fuel which may accumulate in the engine upon an aborted start, flameout, or shutdown of the engine is discharged to the tank upon restart of the engine.

5 Claims, 2 Drawing Figures

FUEL DRAIN SYSTEM

My invention is directed to improvements in systems for discharging any accumulated fuel in a sump or sumps of a gas turbine engine and returning it to the fuel tank of the engine. As is well known to those familiar with such engines, fuel is supplied to a combustion apparatus to heat air flowing through the engine which drives a turbine, the turbine driving a compressor to supply the air to the combustion apparatus. To start the engine, it is cranked up to a sufficient speed, fuel is introduced, and an igniter is energized. Sometimes the engine fails to start properly for one reason or another; also, some circumstance may cause the flame in the engine to be extinguished. In either case some fuel which is not burned may remain in the engine. Also, upon shutdown of the engine, it is possible for some fuel supplied to the engine to accumulate unburned. The resulting pool of unburned fuel presents a hazard in subsequent starting of the engine, since it may have a hot start with the left-over fuel burning along with that normally supplied to the combustion apparatus for starting.

There have been many prior proposals to provide drains from such engines including, in many cases, a valve which leaves the drain open until there is some pressure within the engine indicating that it is being started or is operating. So far as I am aware, such prior systems have normally drained the fuel overboard from the vehicle in which the engine was mounted. Such an arrangement may not be acceptable at present in some types of engine installation.

According to my invention, a valve system is provided by which unburned fuel in the engine is allowed to flow to the engine fuel tank by gravity or be expelled to the tank by pressure incident to coast-down of the engine after stopping; or by pressure generated during a restart of the engine. The system preferably includes means to prevent waste of air or pressurizing the fuel tank from the engine compressor including two valves in series and also, for additional safety, may include a warning system indicating that a drain valve is not properly seated. A backup valve is provided to assure that at least one valve closes in any event.

The principal objects of my invention are to improve the safety of operation and safeguard the integrity of structure of gas turbine engines, to provide a reliable and inoffensive fuel drain system, to provide a system for draining unburned fuel from a gas turbine engine which returns the fuel to the source of supply, and to provide a safe system for returning fuel to a fuel tank which has safeguards against pressurization of the fuel tank and waste of compressed air.

The nature of my invention and its advantages will be apparent to those skilled in the art from the succeeding detailed description of the preferred embodiment of the invention and the accompanying drawings thereof.

Figure 1:
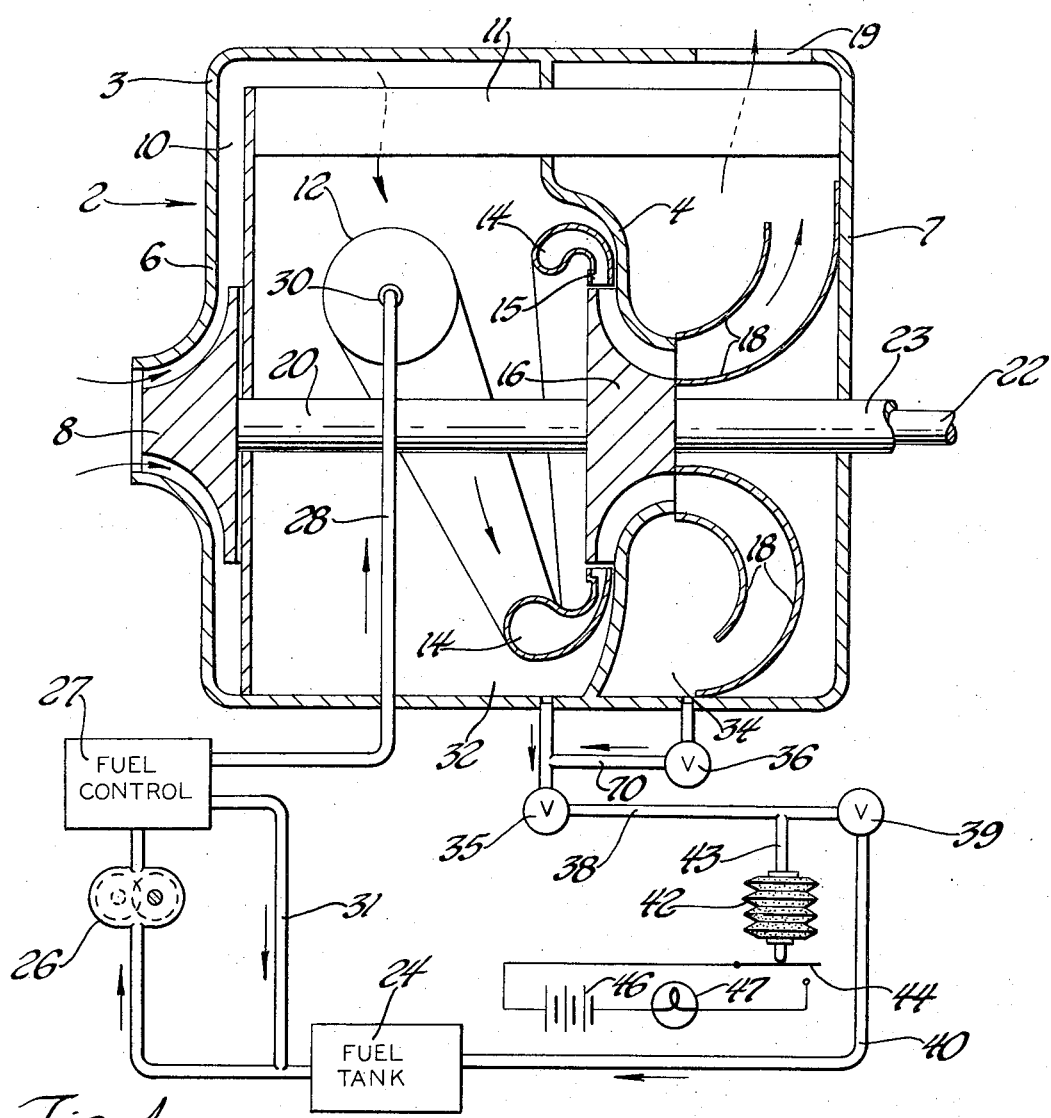
FIG. 1 is a schematic diagram of my fuel drain system as incorporated in a regenerative single shaft gas turbine engine.

Considering first the representative engine with which my invention may be employed, a regenerative gas turbine engine 2 includes an engine case 3 divided into forward and rear portions by a bulkhead 4. The forward portion constitutes a first housing 6 and the rear portion a second housing 7. A radial flow compressor 8 discharges compressed air through a diffuser 10 and a portion of the rotary regenerator disk 11 into the interior of the first housing. Combustion apparatus 12 in this housing discharges combustion products into a scroll 14 and thus through a turbine nozzle 15 and a centripetal turbine wheel 16. The turbine exhaust is guided by an exhaust discharge scroll or diffuser 18 into housing 7 and so through the other portion of the area of regenerator disk 11 to an engine exhaust 19. The turbine 16 drives compressor rotor 8 through a shaft (not illustrated) mounted in a shaft housing 20. Turbine 16 delivers power from the engine through a shaft 22 mounted in a housing 23.

Fuel from a suitable reservoir such as a fuel tank 24 is delivered by a pump 26, which may be driven by the engine, through a fuel control 27 and fuel line 28 to a fuel nozzle 30 in the combustion apparatus 12. The nature of the fuel control is immaterial to my invention; normally, such controls return any excess pumped fuel to the pump inlet through a by-pass line 31.

By the nature of such structure, fuel supplied to nozzle 30 which is not consumed may collect in a sump 32 at the bottom of first housing 6. Such fuel also may be carried through the turbine by gas flow and accumulate in a second sump 34 at the bottom of the second housing 7.

It will be understood that no effort is made here to describe the structure of the engine in detail, since such details of engine structure are of no particular consequence to my invention. Some elements of structure will be described below. For the present, we may proceed to a description of the fuel drain system as illustrated schematically.

Sump 32 is connected to drain through a first valve 35 which is of a type normally open but closed by a small pressure differential from inlet to outlet of the valve. The second sump 34 is connected through a second valve 36 to the inlet of valve 35. Valve 36 is of a type which is normally open but which is closed by a small pressure differential in the direction toward sump 34, this being less than the pressure differential required to close valve 35. Valve 36 remains closed in normal operation of the engine to prevent by-passing of compressed air from housing 6 into housing 7 but, when the pressure in the engine has declined to near atmospheric, the valve can open to allow sump 34 to drain to valve 35. Likewise, when the pressure is low enough, valve 35 opens to permit the combined drainage to flow through the valve to a conduit 38, which may include a catch basin, and on to a valve 39.

The outlet of valve 39 is connected to a fuel return line 40 which returns fuel to the fuel tank 24. This valve is normally open, but is closed by a pressure in the direction from the engine to the tank slightly above the pressure which closes valve 35. Thus, when the engine begins to operate at a low pressure level, any fuel in the sumps or in the conduit 38 is blown through the open valves 36, 35, and 39 and return line 40 to the tank. When cranking or starting of the engine is initiated, the valve 36 closes at a very low value of engine speed, and valve 35 closes at a slightly higher speed. The point of closing is sufficiently high to allow time for any anticipated fuel accumulation to be discharged.

It is undesirable to leave an open line from the engine to the fuel tank, since such engines frequently operate at gauge pressures of the order of 40 psig and it is undesirable to so pressurize the fuel tank or to allow air to continue to flow off. For this reason valve 35 closes at a low pressure such as, for example, 5 psig. In the event valve 35 fails to close, the resulting flow of air through conduits 38 and 40 closes valve 39 at a slightly higher pressure level providing additional safety against undue pressurization of the fuel tank. Valve closing pressures may be, for example, 2 psig for valve 36, 5 psig for valve 35, and 8 psig for valve 39.

Normally, there should be no significant pressure in line 38, and it is desirable to provide an indication if valve 35 has failed to seat fully. This may be accomplished by a pressure responsive device such as a bellows 42 connected to conduit 38 by a branch line 43 and arranged to close a normally open switch 44 upon occurrence of pressure above the normal closing point of valve 35. Such pressure responsive switch assemblies are, of course, well known. As indicated, the switch 44 is connected in series circuit with a battery 46 and an electric light 47 which will be illuminated to warn of the existence of undesired pressure. It is, of course, not to be assumed from the schematic showing that the fuel may drain into the bellows 42. This may be located at any suitable point above the level of the sumps 32 and 34.

Figure 2:
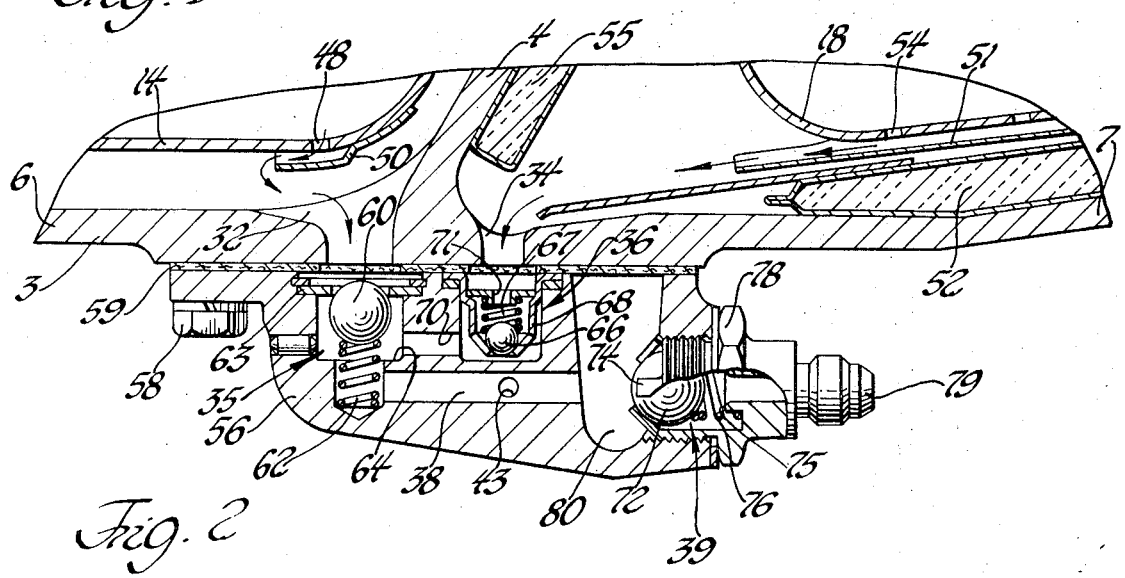
FIG. 2 is a structural drawing of a portion of the engine and of a fuel drain valve assembly associated with the engine.

FIG. 2 shows a preferred structural arrangement of the drain system with a particular engine structure. As illustrated, the engine casing structure 3 defines the first housing 6 and the second housing 7, these being separated by bulkhead 4 previously referred to. The turbine inlet scroll 14 has a fuel drain hole 48 in the bottom of the scroll underlaid by a baffle 50. In normal operation of the engine, air flows inwardly through hole 48 but, upon stoppage of the engine, any collected fuel may flow through the hole into the sump 32.

The exhaust collector 18 is underlaid by a heat shield 51 and an insulating blanket 52. Any fuel which is blown through the turbine and collects in this scroll may escape through a hole 54 and flow, as indicated by the arrows, along the upper surface of heat shield 51 into the sump 34. An insulating blanket 55 is shown on the rear face of bulkhead 4.

The valves 35, 36, and 39 shown schematically in FIG. 1 are illustrated in FIG. 2 as mounted in a valve block or body 56 secured by bolts or studs 58 to a flat mounting pad on the bottom of the engine case 3 and sealed by a gasket 59. The valves 35, 36, and 39 are of conventional spring-biased ball valve types. Valve 35 comprises a ball 60 urged by a compression spring 62 against an internally serrated stop 63 retained by a snap ring. Ball 60 may seat against an annular seat 64 when the spring force is overcome to block flow from sump 32 into the passage 38 extending from the outlet of valve 35.

Valve 36 includes a ball 66 biased by compression spring 67 against fingers at the bottom of a cage 68. Pressure exerted through a line 70 may seat the ball against an annular seat 71.

Valve 39 is of similar structure, with a ball 72 in a cage 74 biased away from an annular seat 75 by a coil spring 76. Valve 39 may be mounted in an outlet fitting 78 threaded into the valve block 56, which includes a conventional connector 79 for connection to the fuel return line 40.

A cavity 80 in the valve block 56 defines a catch basin in which a certain amount of fuel may accumulate. The outlet for line 43 to the pressure responsive switch is also indicated in FIG. 2.

With this arrangement, valves 35, 36, and 39 are held open by spring force when the engine is not operating and any fuel in the combustion apparatus or turbine discharge ducts will drain to the sump 32 or 34 and through open valves 36 and 35 into the catch basin 80. If there is a sufficient quantity of fuel, it will flow through valve 39 and drain to the fuel tank.

When the engine is started, compressor discharge pressure begins to build up and any fuel remaining in the sumps or catch basin is flushed to the fuel tank. At about 2 psig compressor discharge pressure, the valve 36 closes, since the second housing is at atmospheric pressure. At about 5 psig the pressure seats valve 35.

Valve 39 is a backup which closes at a slightly higher pressure in the event that valve 35 does not completely seat. This prevents waste of air from the engine or pressurization of the fuel tank. The pressure switch device 42, 44 will transmit a signal in the event valve 35 fails to close. This switch may be a commercial pressure switch such as are used in motor vehicle lubrication systems to provide an operator warning light. The circuit could, of course, include means for automatically terminating the starting sequence of the engine.

Various types of pressure-responsive valves other than that illustrated may be used, but the ball valves are simple, compact, and reliable.

It will be seen that I have provided a very simple, compact, and effective system to rid the engine of undesired accumulations of fuel and to return these to the tank rather than discharging them overboard.

The detailed description of the preferred embodiment of the invention for the purpose of explaining the principles thereof is not to be considered as limiting or restricting the invention, since many modifications may be made by the exercise of skill in the art.

I claim:

1. A fuel system for a gas turbine engine comprising, in combination, means for supplying fuel from a fuel tank to the engine; combustion apparatus in the engine receiving the fuel and defining a sump adapted to collect unburned fuel; a return line from the sump to the tank adapted to return to the tank fuel expelled from the sump by pressure in the engine; normally open valve means in the line of a type closing in response to a predetermined low pressure differential between the sump and the return line to prevent exertion of significant pressure on the tank, the valve means including two valves in series with the valve nearer the engine closing at a lower pressure differential than the other valve; and means responsive to pressure between the valves for indicating failure of the first valve to close.

2. A fuel drain system for a gas turbine engine including housing means defining a sump, combustion apparatus in the housing means, the engine including means for supplying fuel from a fuel tank to the combustion apparatus; the drain system comprising, in combination, a first valve having an inlet connected to the sump of a type closing in response to a first predetermined pressure differential away from the sump and having an outlet; a fuel return line connected to the fuel tank; a second valve connected between the outlet of the first valve and the fuel return line of a type closing in response to a predetermined pressure differential away from the sump greater than the first predetermined pressure differential; and pressure-signalling means responsive to pressure between the said valves.

3. A fuel drain system for a gas turbine engine including first housing means defining a first sump, combustion apparatus in the first housing means, a turbine supplied by the combustion apparatus, a second housing means adjacent the first housing means providing a discharge conduit from the turbine and defining a second sump, the engine including means for supplying fuel from a fuel tank to the combustion apparatus; the drain system comprising, in combination, a first valve having an inlet connected to the first sump of a type closing in response to a first predetermined pressure differential away from the sump and having an outlet; a second valve having an inlet connected to the second sump of a type closing in response to a predetermined pressure differential toward the second sump less than the first predetermined pressure differential, the second valve having an outlet connected to the inlet of the first valve; a fuel return line connecting the outlet of the first valve to the fuel tank; and pressure-responsive means responsive to pressure in the fuel return line.

4. A fuel drain system for a gas turbine engine including first housing means defining a first sump, combustion apparatus in the first housing means, a turbine supplied by the combustion apparatus, a second housing means adjacent the first housing means providing a discharge conduit from the turbine and defining a second sump, the engine including means for supplying fuel from a fuel tank to the combustion apparatus; the drain system comprising, in combination, a first valve having an inlet connected to the first sump of a type closing in response to a first predetermined pressure differential away from the sump and having an outlet; a second valve having an inlet connected to the second sump of a type closing in response to a predetermined pressure differential toward the second sump less than the first predetermined pressure differential, the second valve having an outlet connected to the inlet of the first valve; a fuel return line connected to the fuel tank; a third valve connected between the outlet of the first valve and the fuel return line of a type closing in response to a predetermined pressure differential away from the sump greater than the first predetermined pressure differential; and pressure-signalling means responsive to pressure between the first and third valves.

5. A fuel drain system for a gas turbine engine including first housing means defining a first sump, combustion apparatus in the first housing means, a turbine supplied by the combustion apparatus, second housing means adjacent the first housing means providing a discharge conduit from the turbine and defining a second sump, the engine including means for supplying fuel from a fuel tank to the combustion apparatus; the drain system comprising, in combination, a first valve having an inlet connected to the first sump of a type closing in response to a first predetermined pressure differential away from the sump and having an outlet; a second valve having an inlet connected to the second sump of a type closing in response to a predetermined pressure differential toward the second sump less than the first predetermined pressure differential, the second valve having an outlet connected to the inlet of the first valve; means defining a catch basin; a fuel return line connected to the fuel tank; a third valve connected between the catch basin and the fuel return line of a type closing in response to a predetermined pressure differential away from the catch basin greater than the first predetermined pressure differential; a drain conduit connecting the outlet of the first valve to the catch basin; and pressure-signalling means responsive to pressure in the said drain conduit.

* * * * *